United States Patent
Nakamura et al.

(10) Patent No.: US 6,235,398 B1
(45) Date of Patent: May 22, 2001

(54) TRANSPARENT LAMINATE AND FILTER FOR PLASMA DISPLAY PANEL USING THE TRANSPARENT LAMINATE

(75) Inventors: Toshitaka Nakamura; Kazuaki Sasa; Yoshihiro Hieda; Kazuhiko Miyauchi, all of Osaka (JP)

(73) Assignee: Nitto Denko Corporation, Ibaraka (JP)

( * ) Notice: Subject to any disclaimer, the term of this patent is extended or adjusted under 35 U.S.C. 154(b) by 0 days.

(21) Appl. No.: 09/458,805

(22) Filed: Dec. 10, 1999

(30) Foreign Application Priority Data

Dec. 11, 1998 (JP) .................................................. 10-352219

(51) Int. Cl.[7] .............................. B32B 15/00; B32B 17/06
(52) U.S. Cl. ......................... 428/432; 359/359; 359/360; 359/580; 359/588; 359/589; 428/336; 428/343; 428/344; 428/212; 428/216; 428/428; 428/432; 428/697; 428/699; 428/701; 428/702
(58) Field of Search .................................... 359/359, 360, 359/580, 586, 588, 589; 428/336, 343, 344, 212, 216, 428, 432, 697, 699, 701, 702

(56) References Cited

U.S. PATENT DOCUMENTS 4,234,654 * 11/1980 Yatabe et al. ......................... 428/434

5,743,778 * 4/1998 Arimoto et al. ........................ 445/8
5,952,084 * 9/1999 Anderson et al. .................... 428/212

FOREIGN PATENT DOCUMENTS

| 55-11804 | 1/1980 | (JP) . |
| 9-176837 | 7/1997 | (JP) . |
| 10-217380 | 8/1998 | (JP) . |
| 10-264287 | 10/1998 | (JP) . |

* cited by examiner

*Primary Examiner*—Deborah Jones
*Assistant Examiner*—Lymarie Miranda
(74) *Attorney, Agent, or Firm*—McGinn & Gibb, PLLC (57) ABSTRACT

A transparent laminate is constituted as follows. A low refractive index transparent film is formed on a surface of the transparent substrate. n units ($3 \leq n \leq 5$) of high refractive index transparent films and silver type transparent electrical are laminated successively on a surface of the low refractive index transparent film. Another high refractive index transparent film is formed on a surface of the n units, and another low refractive index transparent film is formed on a surface of the other high refractive index transparent film. Each of the low refractive index transparent films is an optically transparent film having a refractive index $n_L$ in a range of from 1.3 to 1.6 and each of the high refractive index transparent films is an optically transparent film having a refractive index $n_H$ in a range of from 1.9 to 2.5.

20 Claims, 3 Drawing Sheets

TRANSPARENT LAMINATE AND FILTER FOR PLASMA DISPLAY PANEL USING THE TRANSPARENT LAMINATE

BACKGROUND OF THE INVENTION

1. Field of the Invention

The present invention relates to a transparent laminate and a filter using the transparent laminate for use in a plasma display panel (hereinafter referred to as PDP). Particularly, it relates to a PDP filter disposed on the front surface of a PDP which has a basic function of simultaneously cutting electromagnetic waves and near-infrared rays theoretically generated from the PDP and which is superior in visible light transmission characteristic, visible light low reflection characteristic and surface mar-proofness, and a PDP display unit and a PDP front plate provided with the filter stuck thereto.

The present application is based on Japanese Patent Application No. Hei. 10-352219, which is incorporated herein by reference.

2. Description of the Related Art

Transparent laminates each having a metal thin film layer put between transparent dielectric film layers have been discussed with the advance of thin-film-forming technology represented by a vacuum vapor deposition method or a sputtering method. These transparent laminates can utilize both electrically conducting characteristic and infrared reflection characteristic of the metal thin film layer and can provide a function of preventing reflection of visible light on a metal surface by means of the transparent dielectric film layers. For example, these transparent laminates are used in transparent heat-insulating materials for solar cells, green houses for agriculture, window materials for buildings, show-cases for food, and so on, because these transparent laminates transmit visible light rays and reflect heat rays. Further, these laminates are used suitably in electrodes for liquid-crystal displays, electrodes for field light-emitters, electromagnetic wave shielding films, antistatic films, and so on, because these laminates are transparent and exhibit high electrically conducting characteristic. The configurations of these transparent laminates are disclosed, for example, in Japanese Patent Publications No. Sho. 55-11804, Hei. 9-176837, and so on.

On the other hand, with respect to display technology, a plasma display panel (hereinafter referred to as PDP) has been developed as a large-screen display in compliance with the wishes of reduction of thickness and weight and increase of screen size.

The PDP generates electric discharge in a gas mainly containing a rare gas, especially neon, enclosed in the panel. Fluorescent substances of R, G and B applied on cells in the panel are made to emit light by vacuum ultraviolet rays generated by the electric discharge. In this light-emitting process, electromagnetic waves and near-infrared rays unnecessary for the operation of the PDP are emitted simultaneously. Particularly, electromagnetic waves not only cause malfunctions of peripheral devices but also have a bad influence on human bodies. Accordingly, it is necessary to cut the electromagnetic waves.

Further, the wave length of the near-infrared rays emitted is in a range of from 850 to 1200 nm. On the other hand, the light-receiving sensitivity of remote controllers for domestic electrification products, karaoke, audio and video appliances, and so on, is in a range of from 700 to 1300 nm. There arises a problem that near-infrared rays emitted from the PDP cause the malfunctions of the remote controllers. Accordingly, it is necessary to cut the intensive near-infrared rays theoretically generated from the PDP.

Therefore, a filter capable of simultaneously cutting electromagnetic waves and near-infrared rays generated from the PDP has been discussed. For example, a plate, or the like, formed by sticking or thermally fusion-bonding an acrylic sheet having metal mesh or etching mesh embedded therein to an acrylic sheet mixed with a dye type material for absorbing near-infrared rays has been heretofore used as the filter. The mesh type filter was easy to obtain a low surface resistance value. The mesh type filter, however, had a problem in image blurring due to a moire phenomenon generated between pixel pitch and electrically conductive mesh, durability of a near-infrared absorbing material, and so on. Further, the amount of the near-infrared absorbing material to be added needed to increase in order to improve the near-infrared cut factor. With the increase of the amount of the near-infrared absorbing material, however, the defects of lowering of the visible light transmission factor and occurrence of color-eye could not be avoided.

On the other hand, application of the aforementioned transparent laminate to a PDP filter has been discussed. It is however the existing circumstances that it is impossible to obtain any transparent laminate which can sufficiently satisfy various characteristics such as electromagnetic wave shielding characteristic, near-infrared cutting characteristic, visible light transmission characteristic, low reflection characteristic, low surface resistance, and so on, with a comparatively simple configuration.

SUMMARY OF THE INVENTION

An object of the present invention is to provide a transparent laminate especially suitably used as an optical basic member in a PDP filter, and a light and thin-type PDP filter which satisfies various characteristics such as electromagnetic wave shielding characteristic, near-infrared cutting characteristic, visible light transmission characteristic, visible light low reflection characteristic, low surface resistance, surface mar-proofness, and so on, required by the PDP filter and which is good in visual recognition characteristic. Another object of the present invention is to provide a PDP display unit and a PDP front plate provided with the PDP filter.

As a result of eager discussion in order to solve the above objects, the present inventors have attained the invention which is a transparent laminate comprising: a transparent substrate; a low refractive index transparent film formed on a surface of the transparent substrate; n units ($3 \leq n \leq 5$) of high refractive index transparent films and silver type transparent electrical conductor -films each unit consisting of high refractive index transparent films and silver type transparent electrical conductor films, the n units being laminated successively on a surface of the low refractive index transparent film; another high refractive index transparent film formed on a surface of the n units; and another low refractive index transparent film formed on a surface of the other high refractive index transparent film, wherein each of the low refractive index transparent films is an optically transparent film having a refractive index $n_L$ in a range of from 1.3 to 1.6 and each of the high refractive index transparent films is an optically transparent film having a refractive index $n_H$ in a range of from 1.9 to 2.5.

In the above optical condition, it is preferable to satisfy the condition that the thickness of the low refractive index transparent film formed on a surface of the transparent substrate is $1 \times (\lambda/4n_L)$, the thickness of the low refractive index transparent film in the outermost layer is $2\times(\lambda/4n_L)$, the thickness of each of the high refractive index transparent films adjacent to the low refractive index transparent films is $(1/2)\times(\lambda/4n_H)$, the thickness of each of the high refractive index films sandwiched between the silver type transparent electrical conductor films is $1\times(\lambda/4n_H)$ and the thickness of each of the silver type transparent electrical conductor films is $(1/5)\times(\lambda/4n_H)\times(n_H-1)$ when the optical center wavelength $\lambda$ is 550 nm. In this condition, the thickness change of each of the low refractive index transparent films, the high refractive index transparent films and the silver type transparent electrical conductor films may be in a range of ±20%.

In this invention, it is preferable that the high refractive index transparent film is a thin film made from one compound or two or more compounds selected from the group consisting of indium oxide, tin oxide, titanium dioxide, cerium oxide, zirconium oxide, zinc oxide, tantalum oxide, niobium pentoxide, and zinc sulfide. Further, it is preferable that the silver type transparent electrical conductor film is a thin film made from 90% or higher by weight of silver and one compound or two or more elements selected from the group consisting of gold, copper, palladium, platinum, manganese, and cadmium.

Further, the transparent laminate according to the present invention has been obtained by the examination on the factors such as the thickness, the number of configuration layers, the material, the refractive index, the forming manner, and so on, of each of the dielectric film and the silver type transparent electrical conductor film; and by suitable design. It is therefore preferable that the transparent laminate has a visible light transmission factor of not lower than 50%, a visible light reflection factor of not higher than 5%, a surface resistance of not larger than 3 Ω/□ and a near-infrared cut factor of not lower than 80% in a region of wave length longer than 800 nm. Further, it is preferable that the transparent laminate is provided with an anti-contamination layer having a thickness of not larger than 10 nm and formed on a surface of the low refractive index transparent film in the outermost layer. Another mode of the present invention relates to a PDP filter using such a transparent laminate, and it is preferable that a transparent pressure sensitive adhesive layer having a thickness in a range of from 10 to 500 μm is formed on a rear surface of the transparent laminate.

Owing to the formation of the above-mentioned transparent pressure sensitive adhesive layer, it is possible to provide a PDP display unit wherein a PDP filter is bonded directly to a front display glass portion of a PDP through a transparent pressure sensitive adhesive layer. Further, it is possible to provide a PDP front plate, wherein the front plate is provided with a PDP filter, and a transparent molded body disposed through an air layer on the front side of the PDP, the PDP filter being bonded through a transparent pressure sensitive adhesive layer to a surface of the transparent molded body opposite to the PDP side. In this case, an anti-glare layer or an anti-Newton-ring layer may be formed directly on the PDP side of the transparent molded body disposed through the air layer on the front side of the PDP or is formed on a transparent film and bonded through a transparent pressure sensitive adhesive layer to the PDP side of the transparent molded body. Such a PDP front plate is provided on the front surface of a PDP to constitute a PDP display unit.

Features and advantages of the invention will become understood from the following detailed description of the preferred embodiments described in conjunction with the attached drawings.

DETAILED DESCRIPTION OF THE PREFERRED EMBODIMENTS

Respective examples of a transparent laminate and a PDP filter according to the present invention will be described below specifically with reference to FIGS. 1 and 2.

Figure 1:
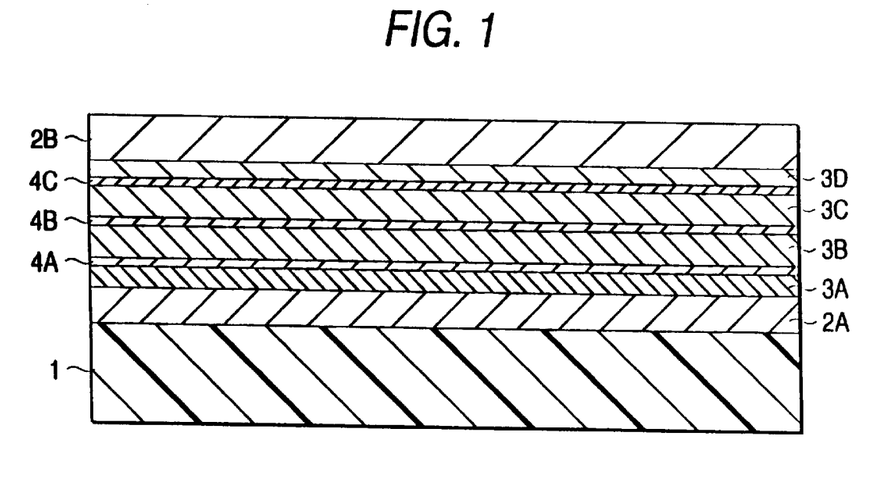
FIG. 1 is a schematic sectional view showing an embodiment of a transparent laminate according to the present invention.

FIG. 1 is a schematic sectional view showing a transparent laminate having a transparent substrate 1, a low refractive index transparent film 2A formed on a surface of the transparent substrate 1, units (for example, 3 units in FIG. 1) each consisting of a combination of a high refractive index transparent film (3A, 3B, 3C) and a silver type transparent electrical conductor film (4A, 4B, 4C) and laminated successively on a surface of the low refractive index transparent film 2A, a high refractive index transparent film 3D laminated on a surface of the silver type transparent electrical conductor film 4C, and a low refractive index transparent film 2B formed on a surface of the high refractive index transparent film 3D.

Each of the low refractive index transparent films (2A, 2B) is an optically transparent film having a refractive index $n_L$ in a range of from 1.3 to 1.6. Each of the high refractive index transparent films (3A, 3B, 3C, 3D) is an optically transparent film having a refractive index $n_H$ in a range of from 1.8 to 2.5.

The thicknesses of the respective films are designed as follows. When the optical center wavelength $\lambda$ is 550 nm, the thickness of the low refractive index transparent film 2A formed on a surface of the transparent substrate is $1\times(\lambda/4n_L)$, the thickness of the low refractive index transparent film 2B in the outermost layer is $2\times(\lambda/4n_L)$, the thickness of each of the high refractive index transparent film 3A adjacent to the low refractive index transparent film 2A and the high refractive index transparent film 3D adjacent to the low refractive index transparent film 2B is $(1/2)\times(\lambda/4n_H)$, the thickness of each of the high refractive index transparent film 3B interposed between the silver type transparent electrical conductor films (4A, 4B) and the high refractive index transparent film 3C interposed between the silver type transparent electrical conductor films (4B, 4C) is $1\times(\lambda/4n_H)$ and the thickness of each of the silver type transparent electrical conductor films (4A, 4B, 4C) is $(1/5)\times(\lambda/4n_H)\times(n_H-1)$. Further, the low refractive index transparent films, the high refractive index transparent films and the silver type transparent electrical conductor films can be used suitably if the thickness of each of the films is in a range of ±20% with the aforementioned thickness as a center.

Figure 2:
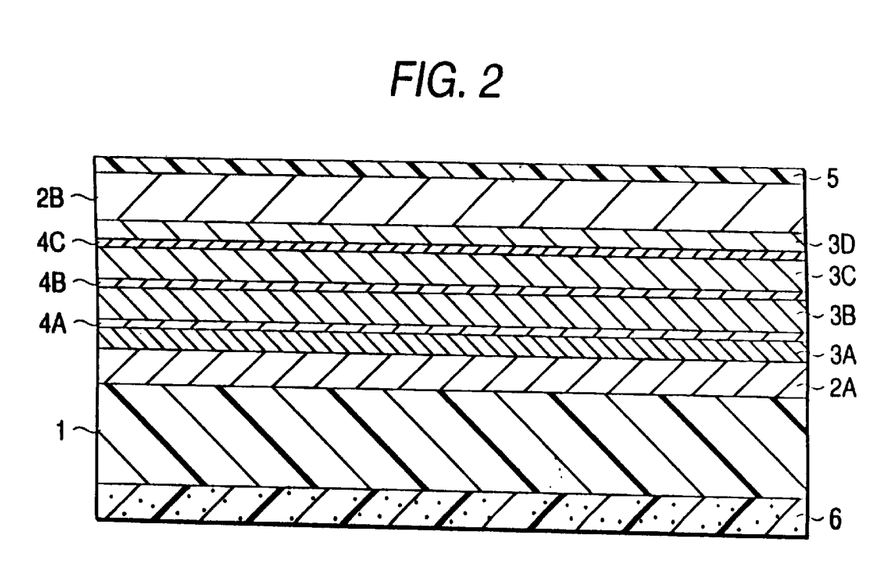
FIG. 2 is a schematic sectional view showing an embodiment of a filter for a plasma display panel according to the present invention.

FIG. 2 is a sectional view showing an example of a PDP filter using the transparent laminate depicted in FIG. 1. In FIG. 2, an anti-contamination layer 5 is formed on a front surface of the low refractive index transparent film 2B in the outermost layer and a transparent pressure sensitive adhesive layer 6 for sticking the PDP filter is formed on a rear surface of the transparent laminate, that is, on a rear surface of the transparent substrate 1.

When, for example, transparent dielectric materials having refractive indexes $n_L$ and $n_H$ of 1.4 and 2.0 are selected as material for a low refractive index transparent film material and material for a high refractive index transparent film respectively in the above description with reference to FIGS. 1 and 2, the thicknesses of the respective films are determined as follows.

Low refractive index transparent film 2A: 98.2 nm±19.6 nm
High refractive index transparent film 3A, 3D: 34.4 nm±6.9 nm
High refractive index transparent film 3B, 3C: 68.8 nm±13.8 nm
Silver type transparent electrical conductor film 4A, 4B, 4C: 13.1 nm±2.6 nm
Low refractive index transparent film 2B: 196.4 nm±39.3 nm In the present invention, the low refractive index transparent films 2A and 2B may be made from the same material or from different materials respectively. When different materials are used, the thicknesses of the films may be determined on the basis of the refractive indexes of the materials according to the rule of the present invention.

Any substrate having transparency in a visible light region and having some degree of surface smoothness can be used as the transparent substrate 1 in the present invention. For example, polyethylene terephthalate, triacetyl cellulose, polyethylene naphthalate, polyether sulfone, polycarbonate, polyacrylate, polyether ether ketone, or the like, is preferable. The thickness of the substrate is not limited unless there is any problem in heat-wrinkling, or the like, in a dry process. Generally, a substrate having a thickness of from 10 to 250 μm is used. A macromolecular film per se may be used as the substrate or a macromolecular film having a single surface or opposite surfaces coated with a hard coating layer may be used as the substrate. The hard coating layer may be of an ultraviolet-curable type or of a heat-curable type. The thickness of the hard coating layer is preferably in a range of from 1 to 10 μm. Further, to suppress interface reflection, the refractive index of the hard coating layer is preferably made to coincide with the refractive index of the transparent substrate.

Any optical film material having a low refractive index and being transparent in a visible light region can be used as a material for the low refractive index transparent films. The refractive index of each of the thin films is preferably in a range of from 1.3 to 1.6. Each of the thin films may be formed by a dry process such as a sputtering method, a vacuum vapor deposition method, an ion-plating method, or the like, or may be formed by a wet process such as a gravure coating method, a micro-gravure coating method, a reverse coating method, a dip coating method, or the like. A material having good adhesion both to the transparent substrate 1 and to the high refractive index transparent film 3A is preferably used as the material for the low refractive index transparent film 2A. Further, an adhesion facilitating process may be performed, for example, by providing a primer coating layer on a surface of the transparent substrate 1. Examples of the preferred material include: magnesium fluoride; silicon dioxide; silicon oxide, fluorine-containing silicon oxide; heat-curable or ultraviolet-curable fluorine type or silicon type macromolecular material; and so on.

The material used for the low refractive index transparent film 2B is preferably a material which is so excellent in mar-proofness as to serve as an overcoat layer in the outermost surface. Accordingly, it is preferable that the material is as thick as possible. According to the present invention, it is preferable that the refractive index of the material is as low as possible because the thickness of the film can increase as the refractive index decreases. More preferably, the low refractive index transparent film 2B per se may be made from a material having anti-contamination characteristic. Examples of the preferred material include: magnesium fluoride; silicon dioxide; silicon oxide, fluorine-containing silicon oxide; heat-curable or ultraviolet-curable fluorine type or silicon type macromolecular material; and so on.

An anti-contamination layer having a thickness of not larger than 10 nm may be further formed on a surface of the low refractive index transparent film 2B. When the thickness of the anti-contamination layer is not larger than 10 nm, anti-contamination characteristic can be provided without any change of optical characteristic of the transparent laminate because the anti-contamination layer is sufficiently thin relative to the wavelength of light in a visible light region. Examples of the material for the anti-contamination layer 5 include: a hardened material of an organic polysiloxane type polymer or of a perfluoroalkyl-containing polymer; an alkoxysilane compound having a perfluoroalkyl group; a compound having a perfluoropolyether group and a reactive silyl group; a mono-/di-silane compound having a perfluoroalkyl group; and so on.

Any optical film material having a high refractive index can be used to some degree as a material for the high refractive index transparent films. The refractive index of each of the thin films is preferably in a range of from 1.9 to 2.5. According to the present invention, it is preferable in terms of reduction of surface resistivity that the refractive index of each of the high refractive index transparent films is set to be as high as possible, because the silver type transparent electrical conductor films can become thick without spoiling the visible light transmission characteristic. Further, a single high refractive index dielectric may be used or a sintered material made from a plurality of high refractive index dielectrics may be used. Further, a material having an effect of preventing migration of the silver type transparent electrical conductor films and having a water/oxygen barrier effect may be used more preferably. Examples of the preferred material for the high refractive index transparent films include: a material containing indium oxide as a main component and containing a small amount of titanium dioxide, tin oxide or cerium oxide; titanium dioxide; zirconium oxide; zinc sulfide; bismuth oxide; niobium pentoxide; and so on. These thin-film layers can be provided by a vacuum dry process such as sputtering, vacuum vapor deposition, ion-plating, or the like.

Generally, the material containing indium oxide as a main component absorbs light, so that the extinction coefficient of the material is not always zero. In application of the relation between the refractive index of each of the dielectric films and the thickness thereof in the present invention, it is, however, necessary to consider only the refractive index regardless of the extinction coefficient. In other words, the aforementioned relation is satisfied if the refractive index is not treated as a complex refractive index but treated as a value of the refractive index $n_H$ of a real-number portion. Incidentally, in order to obtain a high visible light transmission factor, it is preferable that the extinction coefficient is as small as possible.

A material for the silver type transparent electrical conductor films contains not less than 90% by weight of silver, and one element or two or more elements selected from the group consisting of gold, copper, palladium, platinum, manganese, and cadmium. A solid solution containing 90 to 99% by weight of silver, and 1 to 10% by weight of the aforementioned metal is preferably used as the material. Especially, a solid solution containing 1 to 10% by weight of gold in silver is preferable in terms of prevention of deterioration of silver. If the amount of gold to be mixed is larger than 10% by weight, specific resistance increases so that it is difficult to obtain a low resistance value. If the amount of gold is smaller than 1% by weight, deterioration of silver occurs easily. A vacuum dry process such as a sputtering method, or the like, is used as means for forming the silver type transparent electric conductor films.

As shown in FIG. 2, the transparent pressure sensitive adhesive layer 6 is formed on the rear surface of the transparent substrate 1 for the PDP filter. When the transparent substrate 1 is stuck directly to the front display glass portion of the PDP through the transparent pressure sensitive adhesive layer 6, not only prevention of scattering of glass and reduction in weight, thickness and cost of the PDP per se can be achieved but also the air layer having a low refractive index is eliminated compared with the case where a front plate is disposed on a PDP body separately. Accordingly, the problem in increase of the visible light reflection factor due to superfluous interface reflection, double reflection, and so on, is solved, so that the visual recognition characteristic of the PDP is improved greatly.

A material having an elastic modulus of from $1 \times 10^5$ to $1 \times 10^7$ dyne/cm$^2$ and a thickness of from 10 to 500 $\mu$m, preferably from 25 to 300 $\mu$m, is used for the transparent pressure sensitive adhesive layer in the present invention. Examples of the material include an acrylic type pressure sensitive adhesive, a rubber type pressure sensitive adhesive, a polyester type pressure sensitive adhesive, and so on. Especially, an acrylic type pressure sensitive adhesive is used preferably. As the acrylic type pressure sensitive adhesive, there is used a material formed by adding various additives such as a cross-linking agent, etc., to an acrylic type polymer. The acrylic type polymer is obtained by polymerizing a material including: at least one kind of alkyl (meth)acrylate esters exhibiting a glass transition point of not higher than –10° C. when polymerized, as main monomers for giving moderate wetness and flexibility as a pressure sensitive adhesive layer; and, if necessary, functional group-containing monomers such as acrylic acid, methacrylic acid, 2-hydroxyethyl acrylate, etc., and other copolymerizable monomers, by a method such as a solution polymerization method, an emulsion polymerization method, a self-polymerization method (especially a polymerization method using ultraviolet rays), a suspension polymerization method, or the like, with use of a suitable polymerization catalyst. The transparent pressure sensitive adhesive may be of a heat-crosslinkable type or may be of a photo-crosslinkable type (using ultraviolet rays or electron rays).

When the transparent pressure sensitive adhesive layer having the aforementioned characteristic is used, the transparent substrate 1 can be stuck to the front display glass of the PDP well because the transparent pressure sensitive adhesive layer absorbs undulation of the PDP glass surface when the transparent substrate 1 is directly stuck to the front display glass of the PDP. Further, even in the case where an alien substance from the outside collides with the film after the sticking, not only the cushioning effect of the pressure sensitive adhesive layer prevents the film surface from being injured but also the instantaneously reduced thickness of the pressure sensitive adhesive layer is self-restored soon if the transparent pressure sensitive adhesive layer satisfies the aforementioned condition. That is, there is obtained characteristic that the film surface is restored to a smooth surface as if nothing occurred.

Figure 4:
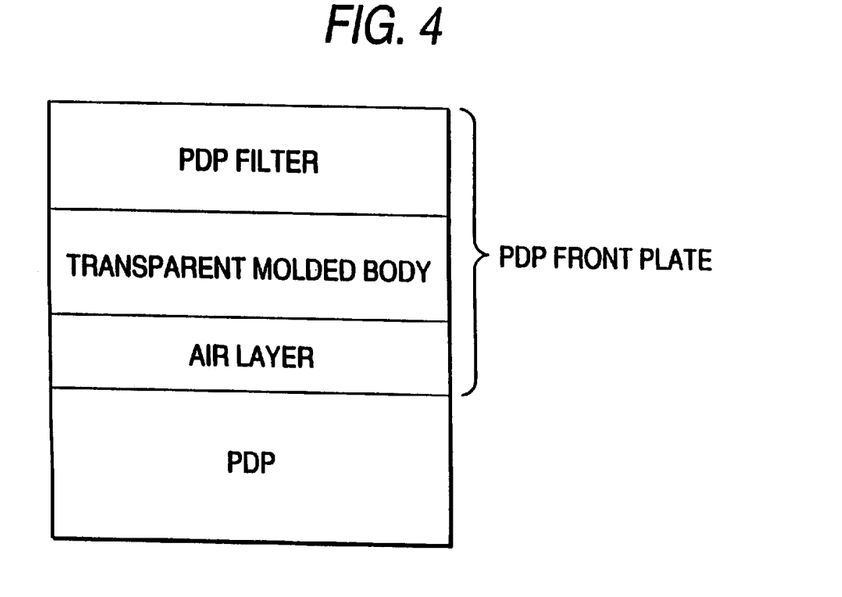
FIG. 4 is a schematic sectional view showing an embodiment of a front plate for a plasma display panel according to the present invention.

Further, in consideration of the fact that the strength of the front display glass is not satisfactory in the PDP producing process, the PDP front plate obtained by sticking the PDP filter through the transparent pressure sensitive adhesive layer onto the surface of a transparent molded body may be disposed, through an air layer, in the front side of the PDP (FIG. 4). In this case, a glass plate, an acrylic plate, a polycarbonate plate, or the like, may be used preferably as the transparent molded body but there is no specific limitation.

Figure 5:
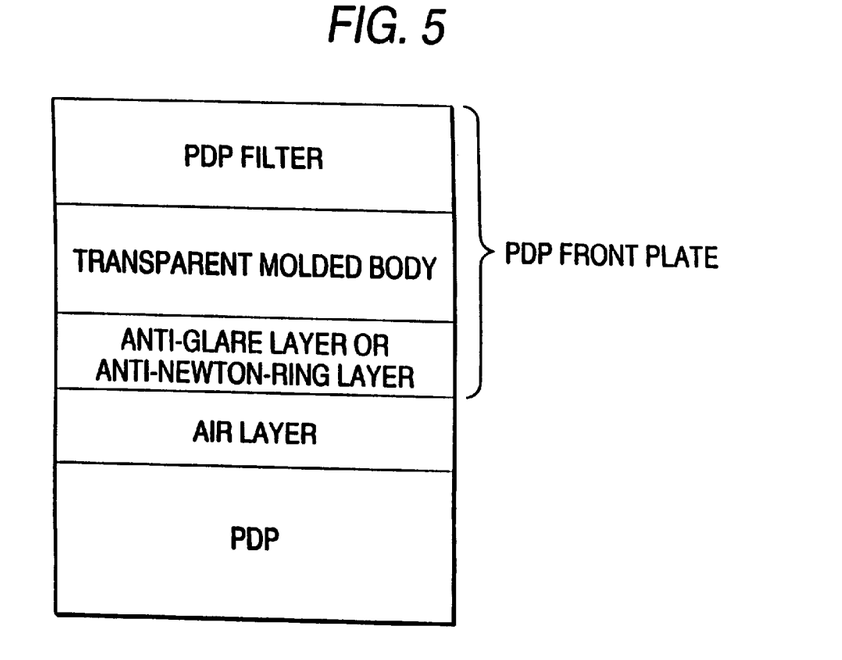
FIG. 5 is a schematic sectional view showing another embodiment of a front plate for a plasma display panel according to the present invention.

Further, an anti-glare layer or an anti-Newton-ring layer may be formed directly on the PDP-side surface of the transparent molded body or formed on a transparent film and stuck through the transparent pressure sensitive adhesive layer to the PDP-side surface of the transparent molded body in the first example in order to suppress the occurrence of double reflection and Newton rings (FIG. 5). The terminology "anti-glare layer" or "anti-Newton-ring layer" used in the present invention means a layer which has slight surface roughness in a range of from about 0.1 $\mu$m to about 10 $\mu$m and which is transparent with respect to visible light rays. Known techniques may be applied to such an anti-glare layer or an anti-Newton-ring layer.

In the PDP filter or the PDP front plate in the present invention, a pigment, or the like, for adjusting the color tone of a transparent color may be used to be added, for example, to the transparent substrate, the transparent molded body, or the transparent pressure sensitive adhesive. Alternatively, a suitable layer obtained by dispersing the aforementioned pigment, or the like, in a binder resin may be provided on the PDP filter or the PDP front plate.

Further, a circumferential edge portion of an electrically conductive surface of the transparent laminate needs to be electrically connected to the PDP for the purposes of improving an electromagnetic wave shielding effect and of preventing the electromagnetic wave shielding effect from lowering due to electromagnetic waves regenerated by electrical charges induced by absorbed electromagnetic waves. Generally, the high refractive index transparent film (3D in FIG. 2) is sufficiently thin, so that electrical connection can be achieved when, for example, electrically conductive paste, or the like, is formed on a surface of the high refractive index transparent film. Accordingly, when the low refractive index transparent film (2B in FIG. 2) in the outermost layer is to be applied and formed by a dry process or by a wet process, the low refractive index transparent film may be formed only on an opening portion so that electrical connection can be provided from the circumferential edge portion of the transparent laminate.

Electrodes can be formed in the circumferential edge portion, for example, by printing or applying electrically conductive paste available on the market, by laminating an electrically conductive tape or by forming a film of an alloy made from at least one element selected from silver, copper, gold, platinum, nickel, aluminum, chrome, zinc, etc. by a vacuum vapor deposition method, a sputtering method, or the like. However, there is no limitation.

The present invention will be described below more specifically on the basis of examples thereof but the present invention is not limited to the examples.

EXAMPLE 1

A transparent laminate was produced by forming a low refractive index transparent film of SiO$_2$ on a single surface of a 125 μm-thick transparent polyethylene terephthalate (PET) film by a reactive pulse DC sputtering method, further forming thin films thereon in order of a high refractive index transparent film, a silver type transparent electrical conductor film and a high refractive index transparent film by a DC magnetron sputtering method and further forming a low refractive index transparent film of SiO$_2$ thereon by a reactive pulse DC sputtering method.

Si was used as a target for forming each of the low refractive index transparent films. In$_2$O$_3$ containing 12.6% by weight of TiO$_2$ (hereinafter abbreviated to "IT") was used as a target material for forming each of the high refractive index transparent films. Ag containing 5% by weight of Au (hereinafter abbreviated to "Ag") was used as a target material for forming each of the silver type transparent electrical conductor films. The surface resistance value was measured by use of Lorester SP made by Mitsubishi Petrochemical Co., Ltd. in the condition that an SiO$_2$ film in the outermost layer had been not formed yet. Further, the optical characteristic was measured by use of U-3410 made by Hitachi Ltd. Especially, the reflection factor was measured in the condition that the surface having no thin film formed was painted with black. Both the visible light transmission factor and the visible light reflection factor were calculated on the basis of obtained transmission and reflection spectra in accordance with JIS R-3016.

Further, both the refractive index $n_L$ of SiO$_2$ and the refractive index $n_H$ of IT were measured at a wavelength of 550 nm by a spectral ellipsometer. Results were as follows.
$n_L$=1.46 (extinction coefficient=0)
$n_H$=2.02 (extinction coefficient=0.0102)

The thicknesses of the respective films in the present invention were calculated on the basis of the aforementioned results so that the following samples (1), (2) and (3) were produced. Incidentally, numerical values were expressed in terms of nm.

(1):PET/SiO$_2$(94)/IT(34)/Ag(14)/IT(68)/Ag(14)/IT(68)/Ag(14)/IT(34)/SiO$_2$(188)
(2):PET/SiO$_2$(94)/IT(34)/Ag(14)/IT(68)/Ag(14)/IT(68)/Ag(14)/IT(68)/Ag(14)/IT(34)/SiO$_2$(188)
(3):PET/SiO$_2$(94)/IT(34)/Ag(14)/IT(68)/Ag(14)/IT(68)/Ag(14)/IT(68)/Ag(14)/IT(34)/SiO$_2$(188)

Comparative Example 1

A sample (4) having a PET film, an SiO$_2$ film formed on the PET film, 3 units each consisting of a combination of an IT film and an Ag film and formed successively on a surface of the SiO$_2$ film, an IT film formed on a surface of the 3 units, and an SiO$_2$ film formed on a surface of the IT film, was produced in the same manner as in Example 1. The sample (4) was formed so that the thickness of each of the Ag layers was out of range in the present invention. Numerical values were expressed in terms of nm.
(4):PET/SiO$_2$(94)/IT(34)/Ag(10)/IT(68)/Ag(15)/IT(68)/Ag(10)/IT(34)/SiO$_2$(188)

Comparative Example 2

A sample (5) having a PET film, an SiO$_2$ film formed on the PET film, 3 units each consisting of a combination of an IT film and an Ag film and formed successively on a surface of the SiO$_2$ film, an IT film formed on a surface of the 3 units, and an SiO$_2$ film formed on a surface of the IT film, was produced in the same manner as in Example 1. The sample (5) was formed so that the thickness of each of the IT layers was out of range in the present invention. Numerical values were expressed in terms of nm.

(5):PET/SiO$_2$(94)/IT(68)/Ag(14)/IT(68)/Ag(14)/IT(68)/Ag(14)/IT(68)/SiO$_2$(188)

Comparative Example 3

A sample (6) having a PET film, an SiO$_2$ film formed on the PET film, 3 units each consisting of a combination of an IT film and an Ag film and formed successively on a surface of the SiO$_2$ film, an IT film formed on a surface of the 3 units, and an SiO$_2$ film formed on a surface of the IT film, was produced in the same manner as in Example 1. The sample (6) was formed so that the thickness of the SiO$_2$ layer adjacent to the PET film was out of range in the present invention. Numerical values were expressed in terms of nm.

(6):PET/SiO$_2$(188)/IT(34)/Ag(14)/IT(68)/Ag(14)/IT(68)/Ag(14)/IT(34)/SiO$_2$(188)

Comparative Example 4

A sample (7) having a PET film, an SiO$_2$ film formed on the PET film, 3 units each consisting of a combination of an IT film and an Ag film and formed successively on a surface of the SiO$_2$ film, and an IT film formed on a surface of the 3 units, was produced in the same manner as in Example 1. The sample (7) had the same configuration as that in the sample (1) described in Example 1 except that the SiO$_2$ layer in the outermost layer was not formed. Numerical values were expressed in terms of nm.

(7):PET/SiO$_2$(94)/IT(34)/Ag(14)/IT(68)/Ag(14)/IT(68)/Ag(14)/IT(34)

Comparative Example 5

A sample (8) having a PET film, 3 units each consisting of a combination of an IT film and an Ag film and formed successively on a surface of the SiO$_2$ film, an IT film formed on a surface of the 3 units, and an SiO$_2$ film formed on a surface of the IT film, was produced in the same manner as in Example 1. The sample (8) had the same configuration as that in the sample (1) described in Example 1 except that the SiO$_2$ layer adjacent to the PET film was not formed. Numerical values were expressed in terms of nm.

(8):PET/IT(34)/Ag(14)/IT(68)/Ag(14)/IT(68)/Ag(14)/IT(34)/SiO$_2$(188)

Figure 3:
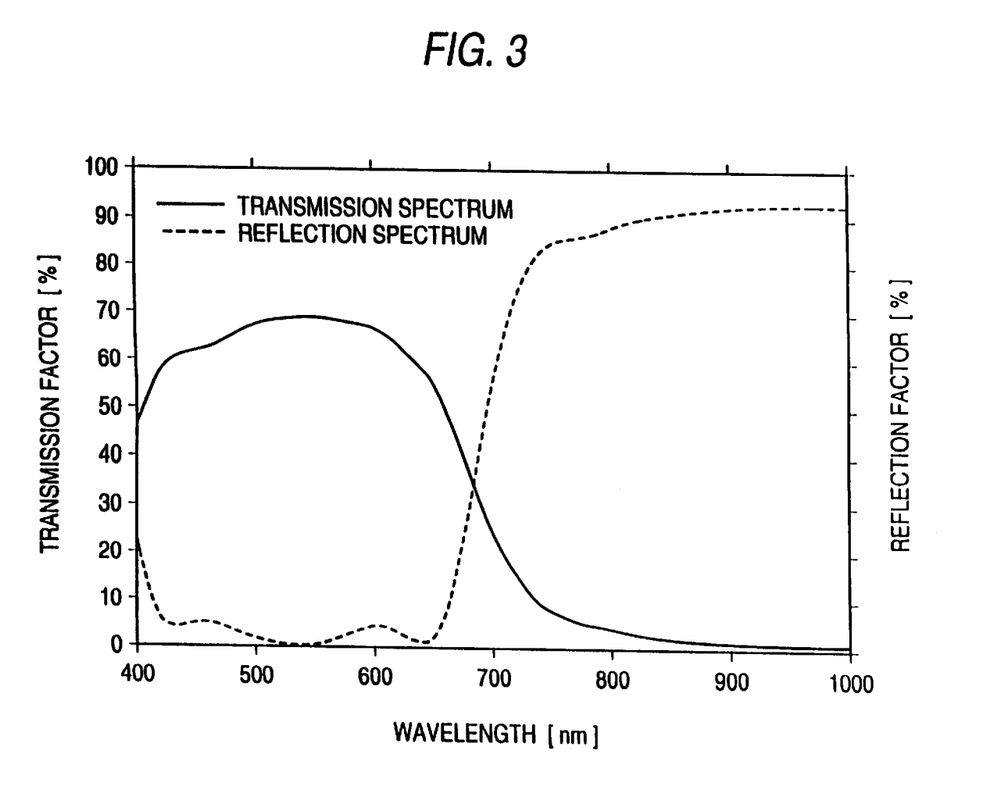
FIG. 3 is a spectral graph showing the optical characteristic of the sample (1) in Example 1.

Visible light transmission and reflection spectra expressing the optical characteristic of the sample (1) were shown in FIG. 3. It was apparent from FIG. 3 that the sample (1) had transparency in a visible light wavelength region and characteristic of cutting near-infrared (IR) rays having a wavelength of not smaller than 800 nm and that the sample (1) was designed so that the visible light reflection factor was minimized at a wavelength near 550 nm in which visibility by human eyes was the most intensive.

Further, the PDP filter characteristics of the samples (1) to (8) were shown in Table 1.

TABLE 1

FILTER CHARACTERISTIC OF SAMPLE

| Item of Characteristic | Examples | | | | Comparative Examples | | | |
|---|---|---|---|---|---|---|---|---|
| | (1) | (2) | (3) | (4) | (5) | (6) | (7) | (8) |
| Surface resistance value ($\Omega/\square$) | 1.8 | 1.4 | 1.1 | 2.4 | 1.8 | 1.8 | 1.8 | 1.8 |
| Visible light transmission factor (%) | 67 | 60 | 53 | 63 | 53 | 65 | 68 | 65 |
| IR cut factor (%) | 95 | 96 | 98 | 88 | 95 | 95 | 93 | 95 |
| Visible light reflection factor (%) | 1.8 | 2.3 | 2.0 | 8.5 | 19.1 | 4.6 | 1.5 | 4.8 |
| Mar-proof test | ○ | ○ | ○ | ○ | ○ | ○ | X | ○ |

In the table, the IR cut factor (%) was a near-infrared cut factor with respect to near-infrared rays in a wavelength range of from 800 to 1200 nm, and the mar-proof test was performed by rubbing each sample with steel wool #0000 ten times under a load of 250 g/cm$^2$ and by evaluating the degrees of scratches on the surface of the sample by eye observation to thereby regard absence of scratches as ○ and presence of scratches as X.

Each of the samples (1) trough (3) produced according to the present invention as described in Example 1 simultaneously satisfied electromagnetic wave shielding characteristic, IR cut characteristic, visible light transmission characteristic, visible light low reflection characteristic and surface mar-proofness generally required for the PDP filter. The number of silver type transparent electrical conductor film layers in the sample (1) was three. When the number of layers increased to four or five, the surface resistance value was reduced desirably as represented by the samples (2) and (3) in Table 1, but the visible light transmission factor was also reduced. The configuration of the sample (1) which can satisfy the surface resistance value (<2.0 $\Omega/\square$) necessary for electromagnetic wave shielding of the PDP filter is generally preferable in terms of the production process and cost.

The sample (4) described in Comparative Example 1 did not satisfy the characteristic required for the PDP filter because the surface resistance value was high and the IR cut factor was low. Furthermore, the visible light reflection factor of the sample (4) became high.

The sample (5) described in Comparative Example 2 could not be used as a PDP filter because not only the visible light transmission factor, especially the transmission factor with respect to a wavelength near 480 nm, was reduced greatly but also the visible light reflection factor exhibited a very large value of 19.1%.

The sample (6) described in Comparative Example 3 was unsatisfactory because the visible light reflection factor exhibited a high value of 4.6%.

The sample (7) described in Comparative Example 4 exhibited a surface resistance value equal to that of the sample (1) and was excellent both in visible light transmission factor and in visible light reflection factor. Lack of mar-proofness was, however, observed as a disadvantage of the sample (7). Since this sample was configured so that an IT film having a slight thickness of 34 nm was merely formed on a surface of the silver type transparent electrical conductor film lacking mar-proofness, remarkable scratches were observed on the filter surface after the mar-proof test. Accordingly, the configuration in which this filter was used as the outermost layer could not be used.

The sample (8) described in Comparative Example 5 satisfied mar-proofness but was unsuitable for a PDP filter because the visible light reflection factor was high.

EXAMPLE 2

A fluorine type heat-curable macromolecular material (trade name: LR-201 made by Nissan Chemical Industries, Ltd.) having a refractive index of 1.36 as a low refractive index transparent film material was applied on a 125 $\mu$m-thick PET film by a gravure coating method. Then, 3 units each consisting of a combination of an IT film and an Ag film were laminated successively on a surface of the low refractive index transparent film. Then, an IT film was formed on a surface of the 3 units. Then, an SiO$_2$ film was formed on a surface of the IT film by a reactive pulse DC sputtering method. Thus, a sample (9) was produced. In the sample (9), the thicknesses of the respective films were calculated according to the present invention. Numerical values were expressed in terms of nm.

(9):PET/LR-201(101)/IT(34)/Ag(14)/IT(68)/Ag(14)/IT(68)/Ag(14)/IT(34)/SiO$_2$(188)

EXAMPLE 3

An SiO$_2$ film was formed on a 125 $\mu$m-thick PET film by a reactive pulse DC sputtering method. Then, 3 units each consisting of a combination of an IT film and an Ag film were laminated successively on a surface of the SiO$_2$ film. Then, an IT film was formed on a surface of the 3 units. An acrylic type ultraviolet-curable hard coating material (trade name: Z7501 made by JSR Co., LTD.) having a refractive index of 1.50 was applied on an IT film by a gravure coating method. Thus, a sample (10) was produced. In the sample (10), the thicknesses of the respective films were calculated according to the present invention. Numerical values were expressed in terms of nm.

(10):PET/SiO$_2$(94)/IT(34)/Ag(14)/IT(68)/Ag(14)/IT(68)/Ag(14)/IT(34)/Z7501(183)

Comparative Example 6

A TiO$_2$ film having a refractive index of 2.36 was formed on a 125 $\mu$m-thick PET film by a vacuum evaporation method. Then, 3 units each consisting of a combination of an IT film and an Ag film were laminated successively on a surface of the TiO$_2$. Then, an IT film was formed on a surface of the 3 units. Then, an SiO$_2$ film was formed on a surface of the IT film by a reactive pulse DC sputtering method. Thus, a sample (11) was produced. Numerical values were expressed in terms of nm.

(11):PET/TiO$_2$(58)/IT(34)/Ag(14)/IT(68)/Ag(14)/IT(68)/Ag(14)/IT(34)/SiO$_2$(188)

Comparative Example 7

An SiO$_2$ film was formed on a 125 $\mu$m-thick PET film by a reactive pulse DC sputtering method. Then, 3 units each consisting of a combination of an IT film and an Ag film were laminated successively on a surface of the SiO$_2$ film. Then, an IT film was formed on a surface of the 3 units. A TiO$_2$ film having a refractive index of 2.36 was formed on an IT film by a vacuum evaporation method. Thus, a sample (12) was produced. Numerical values were expressed in terms of nm.

(12):PET/SiO$_2$(94)/IT(34)/Ag(14)/IT(68)/Ag(14)/IT(68)/Ag(14)/IT(34)/TiO$_2$(115)

Comparative Example 8

A TiO$_2$ film having a refractive index of 2.36 was formed on a 125 $\mu$m-thick PET film by a vacuum evaporation method. Then, 3 units each consisting of a combination of an IT film and an Ag film were laminated successively on a surface of the TiO$_2$ film. Then, an IT film was formed on a surface of the 3 units. Then, a TiO$_2$ film was formed on a surface of the IT film. Thus, a sample (13) was produced. Numerical values were expressed in terms of nm.

(13):PET/TiO$_2$(58)/IT(34)/Ag(14)/IT(68)/Ag(14)/IT(68)/Ag(14)/IT(34)/TiO$_2$(115)

The PDP filter characteristics of the samples (9) to (13) were shown in Table 2.

TABLE 2

FILTER CHARACTERISTIC OF SAMPLE

| Item | Sample | | | | |
|---|---|---|---|---|---|
| | Comparative Examples | | Examples | | |
| Characteristic | (9) | (10) | (11) | (12) | (13) |
| Surface resistance value (Ω/□) | 1.8 | 1.8 | 1.8 | 1.8 | 1.8 |
| Visible light transmission factor (%) | 66 | 66 | 51 | 64 | 49 |
| IR cut factor (%) | 95 | 95 | 94 | 94 | 94 |
| Visible light reflection factor (%) | 1.7 | 2.1 | 20.5 | 5.9 | 23.5 |
| Mar-proof test | ○ | ○ | ○ | ○ | ○ |

The sample (9) described in Example 2 and the sample (10) described in Example 3 were different from each other in kind and forming method of the low refractive index transparent film adjacent to the PET surface and of the low refractive index transparent film in the outermost layer. In each of the samples (9) and (10), however, the refractive indexes of the low refractive index transparent films were in a range according to the present invention. Accordingly, a filter satisfying the characteristic generally required for a PDP filter as shown in Table 2 was obtained when the thicknesses of the respective layers were determined according to the present invention. As a result, it was proved that, for example, a material having good adhesion to a base film, a material having both surface mar-proofness and anti-contamination characteristic, or the like, can be used suitably so long as the refractive index is in a range according to the present invention.

The sample (11) described in Comparative Example 6 and the sample (12) described in Comparative Example 7 have shown the case where the low refractive index transparent film adjacent to the PET surface or the low refractive index transparent film in the outermost layer was replaced by a TiO$_2$ film which was a high refractive index transparent film out of the scope of the present invention. In this case, both reduction of the visible light transmission factor and remarkable increase of the visible light reflection factor occurred as shown in Table 2. Accordingly, each of the samples (11) and (12) still could not be applied to a PDP filter.

The sample (13) described in Comparative Example 8 has shown the case where both the low refractive index transparent film adjacent to the PET surface and the low refractive index transparent film in the outermost layer were replaced by TiO$_2$ films which were high refractive index transparent films. The refractive indexes were out of the scope of the present invention. Accordingly, in this case, both reduction of the visible light transmission factor and remarkable increase of the visible light reflection factor were observed as shown in Table 2.

EXAMPLE 4

A silane coupling agent (trade name: KP801M made by Shin-etsu Chemical Industry Co., Ltd.) having a perfluoroalkyl group was used as an anti-contamination material so that an anti-contamination layer having a thickness of about 8 nm was formed, by a gravure coating method, on a surface of the SiO$_2$ film in the outermost layer in the sample (1) described in Example 1. Thus, a sample (14) was produced.

A surface of the sample (14) had a contact angle of 115° to water and was excellent in water repellency. Fingerprints or stains deposited on the sample surface could be wiped out easily. Further, with respect to the optical characteristic of the sample (14) having the anti-contamination layer, the sample (14) exhibited quite the same transmission and reflection spectra as those in the sample (1). It was confirmed that there was no optical characteristic change due to the formation of the anti-contamination layer.

EXAMPLE 5

An acrylic type pressure sensitive adhesive solution containing 20% by weight of a solid component was applied on a rear surface of the PET film substrate in the sample (14) described in Example 4. The solution was dried at 150° C. for 5 minutes so that a transparent pressure sensitive adhesive layer having a thickness of 100 μm and an elastic modulus of 1.0×10$^6$ dyne/cm$^2$ was formed. Incidentally, in this example, the circumferential edge portion of the outermost layer was masked so that SiO$_2$ was not formed on the circumferential edge portion for the purpose of forming an earthing electrode to improve the electromagnetic wave shielding effect when the sample (14) was produced. Further, the earthing electrode was formed by applying electrically conductive paste (MSP-600F made by Mitsui Chemicals, Inc.) available on the market. Thus, a PDP filter was produced.

The PDP filter was stuck directly to a front display glass portion of a PDP by a roll laminator so that a PDP display unit was produced. The PDP display unit was excellent in visual recognition characteristic because reflection of external light, double reflection, and so on, were suppressed sufficiently without spoiling the merits of small thickness and light weight peculiar to the PDP. The electromagnetic wave shielding characteristic, near-infrared cut characteristic, surface mar-proofness, etc. of the PDP display unit were also excellent because the PDP display unit succeeded to the characteristic of the sample (14) as it was.

EXAMPLE 6

The PDP filter which was produced in Example 5 and in which both the transparent pressure sensitive adhesive layer and the earthing electrode were formed, was stuck onto one main surface of a 3 mm-thick PMMA plate (trade name: ACRYLITE made by Mitsubishi Rayon Co., Ltd.) by a roll laminator. Further, an anti-glare film (KB-N05S made by Kimoto Co., Ltd.) available on the market was stuck onto the opposite surface of the PMMA plate through the aforementioned pressure sensitive adhesive having a thickness of 25 μm. Thus, a PDP front plate was produced so that the anti-glare film was disposed oppositely to the front side of the PDP display unit.

As a result, not only the PDP front plate succeeded to the characteristic of the sample (1) as it was but also the PDP front plate in which double reflection was prevented by the anti-glare layer was obtained. Incidentally, haze rose due to the anti-glare layer.

In the transparent laminate according to the present invention, specific optical design are performed when low refractive index transparent films, high refractive index transparent films and silver type transparent electrically conductor films are laminated successively. Accordingly, there can be provided a PDP filter which satisfies surface mar-proofness simultaneously in addition to electromagnetic wave shielding characteristic, near-infrared cutting characteristic, visible light transmission characteristic and visible light low reflection characteristic particularly required by a PDP. Further, the present invention may be used suitably in the case where the PDP filter is used so as to be stuck directly to a front glass plate of a PDP display unit or in the case where the PDP filter is used as a front plate to be stuck to a transparent substrate. In any case, a PDP display unit excellent in optical characteristic can be provided.

While the presently preferred embodiment of the present invention has been shown and described, it is to be understood that the disclosure is for the purpose of illustration and that various changes and modification may be made without departing from the scope of the invention as set forth in the appended claims.

What is claimed is:

1. A transparent laminate comprising:

a transparent substrate;

a first low refractive index transparent film formed on a top surface of said transparent substrate;

between three and five combination layers of high refractive index transparent films and silver type transparent electrical conductor films, each combination layer comprising one high refractive index transparent film and silver type transparent electrical conductor film, said combination layers being laminated successively on a surface of said first low refractive index transparent film, and another high refractive index transparent film, and another high refractive index transparent film formed on a surface of said combination layers; and a second low refractive index transparent film formed on a surface of said another high refractive index transparent film, wherein each of said first and second low refractive index transparent films comprises an optically transparent film having a refractive index $n_L$ in a range of 1.3 to 1.6 and each of said high refractive index transparent films comprises an optically transparent film having a refractive index $n_H$ in a range of 1.9 to 2.5.

2. A transparent laminate according to claim 1, wherein a thickness of said first low refractive index transparent film is $1\times(\lambda/4n_L)$, a thickness of said second low refractive index transparent film in an outermost layer is $2\times(\lambda/4n_L)$, a thickness of each of said high refractive index transparent films adjacent to each of said first and second low refractive index transparent films is $(1/2)\times(\lambda/4n_H)$, a thickness of each of second high refractive index films sandwiched between said silver type transparent electrical conductor films is $1\times(\lambda/4n_H)$, and a thickness of each of said silver type transparent electrical conductor films is $(1/5)\times(\lambda/4n_H)\times(n_H-1)$, wherein $\lambda$ is an optical center wavelength equal to 550 nm.

3. A transparent laminate according to claim 2, wherein a thickness of each of low refractive index transparent films, said high refractive index transparent films and said silver type transparent electrical conductor films varies no more than ±20%.

4. A transparent laminate according to claim 1, wherein each of said high refractive index transparent films comprises one or more compounds selected from the group consisting of indium oxide, tin oxide, titanium dioxide, cerium oxide, zirconium oxide, zinc oxide, tantalum oxide, niobium pentoxide, and zinc sulfide.

5. A transparent laminate according to claim 1, wherein said silver type transparent electrical conductor film comprises at least 90% by weight of silver and a balance of one or more elements selected from the group consisting of gold, copper, palladium, platinum, manganese, and cadmium.

6. A transparent laminate according to claim 1, wherein said transparent laminate has a minimum visible light transmission factor of 50%, a maximum visible light reflection factor of 5%, a maximum surface resistance of 3 $\Omega/\square$ and a minumum near-infrared cut factor of 80% in a region of wave length longer than 800 nm.

7. A transparent laminate according to claim 1, further comprising an anti-contamination layer having a maximum thickness of 10 nm and formed on a surface of said second low refractive index transparent film.

8. A filter for a plasma display panel comprising a transparent laminate described in claim 1.

9. A filter for a plasma display panel according to claim 8, further comprising a transparent pressure sensitive adhesive layer having a thickness in a range of 10 to 500 μm formed on a bottom surface of said transparent laminate.

10. A plasma display panel display unit wherein a filter according to claim 9 is bonded directly to a front display glass portion of a plasma display panel through said transparent pressure sensitive adhesive layer.

11. A front plate for use in a plasma display panel, comprising:

a filter according to claim 9; and a transparent molded body disposed through an air layer on a front side of said plasma display panel, said filter being bonded through a transparent pressure sensitive adhesive layer to a surface of said transparent molded body opposite said plasma display panel.

12. A front plate for use in a plasma display panel according to claim 11, further comprising:

an anti-glare layer or an anti-Newton-ring layer formed directly on said plasma display panel side of said transparent molded body disposed through said air layer on said front side of said plasma display panel or formed on a transparent film and bonded through a transparent pressure sensitive adhesive layer to said plasma display panel side of said transparent molded body.

13. A filter for a plasma display panel comprising a transparent laminate described in claim 2.

14. A filter for a plasma display panel comprising a transparent laminate described in claim 3.

15. A filter for a plasma display panel comprising a transparent laminate described in claim 4.

16. A filter for a plasma display panel comprising a transparent laminate described in claim 5.

17. A filter for a plasma display panel comprising a transparent laminate described in claim 6.

18. A filter for a plasma display panel comprising a transparent laminate described in claim 7.

19. A filter for a plasma display panel according to claim 13, further comprising a transparent pressure sensitive adhesive layer having a thickness in a range from 10 to 500 μm formed on a bottom surface of said transparent laminate.

20. A filter for a plasma display panel according to claim 14, further comprising a transparent pressure sensitive adhesive layer having a thickness in a range from 10 to 500 μm formed on a rear surface of said transparent laminate.

\* \* \* \* \*